(12) United States Patent
Takeuchi

(10) Patent No.: US 6,205,886 B1
(45) Date of Patent: *Mar. 27, 2001

(54) CONTROL VALVE DEVICES FOR AUTOMATIC TRANSMISSIONS

(75) Inventor: Masahiro Takeuchi, Shizuoka (JP)

(73) Assignee: Jatco Corporation, Fuji (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/020,246

(22) Filed: Feb. 6, 1998

(30) Foreign Application Priority Data

Feb. 17, 1997 (JP) .................................................. 9-032137

(51) Int. Cl.⁷ .................................................. F16H 57/02
(52) U.S. Cl. .................................................. 74/606 R
(58) Field of Search .................. 74/606 R; 477/158; 475/127, 128; 192/87.13, 87.18

(56) References Cited

U.S. PATENT DOCUMENTS

| 4,842,010 | * | 6/1989 | Edgecomb et al. | 74/606 R X |
| 5,148,720 | * | 9/1992 | Swenson, Sr. et al. | 74/606 R |
| 5,538,479 | * | 7/1996 | Niiyama | 475/128 |
| 5,823,071 | * | 10/1998 | Petrosky et al. | 74/606 R |

FOREIGN PATENT DOCUMENTS

| 62-288753 | | 12/1987 | (JP) . | |
| 5157160 | * | 6/1993 | (JP) | 74/606 R |

* cited by examiner

Primary Examiner—Mary Ann Green
(74) Attorney, Agent, or Firm—Foley & Lardner

(57) ABSTRACT

A transmission casing has a valve-body fixing face inside an outer peripheral face includes a control valve assembly having an outer periphery formed with two protrusions which are parallel to the valve-body fixing face of the transmission casing. Each protrusion has an extent substantially corresponding to a finger's length.

5 Claims, 6 Drawing Sheets

CONTROL VALVE DEVICES FOR AUTOMATIC TRANSMISSIONS

BACKGROUND OF THE INVENTION

The present invention relates to control valve devices for automatic transmissions.

One of the conventionally proposed control valve devices for automatic transmissions is known in JP-A 62-288753. This reference shows a structure that a control valve assembly including a valve, etc. for producing a control pressure for automatic shifting is mounted to a transmission casing.

Specifically, a valve body of the control valve assembly is mounted to the transmission casing. An oil strainer is fixed to the control valve assembly. The transmission casing having the control valve assembly arranged therein and an oil pan are connected to each other through a gasket.

With the known control valve device, however, since the transmission casing has a face on which the valve body is fixed inside an outer peripheral face on which the oil pan is fixed, large spaces which allow hand insertion are needed between the valve body of the control valve assembly and the transmission casing to enable mounting and dismounting of the control valve assembly. This results in enlarged size of the transmission casing, and increased number of stages of the valve body due to decrease in a circuit area of the control valve device.

Mounting and dismounting of the control valve assembly can be carried out by holding the oil strainer mounted to the valve body or a pipe. In this case, it is possible to deform the oil strainer to cause air suction, or to disengage the pipe to cause oil leakage.

It is, therefore, an object of the present invention to provide control valve devices for automatic transmissions, which enable easy mounting and dismounting of the control valve assembly even if the spaces are small between the valve body and the transmission casing.

SUMMARY OF THE INVENTION

One aspect of the present invention lies in providing an automatic transmission, comprising:

a casing, said casing having first and second faces, said first face corresponding to an outer peripheral face, said second face being arranged inside said second face; and a valve assembly producing a control pressure for automatic shifting, said valve assembly including a body mounted to said casing, said body having an outer periphery formed with protrusions which are parallel to said second face of said casing, each protrusion having an extent substantially corresponding to a finger's length.

DETAILED DESCRIPTION OF THE INVENTION

Figure 1:
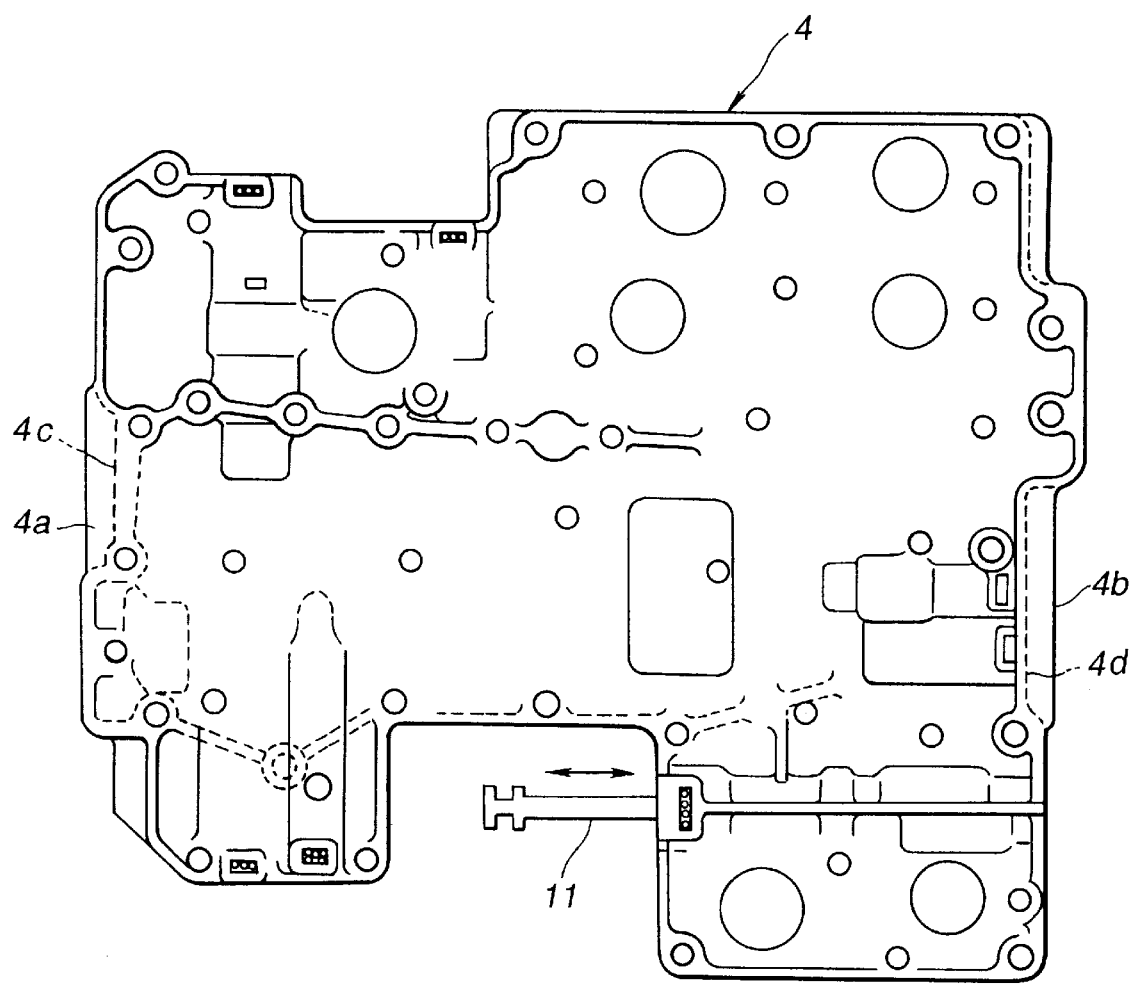
FIG. 1 is a bottom view showing a lower body of a control valve assembly of a control valve device embodying the present invention.
Figure 2:
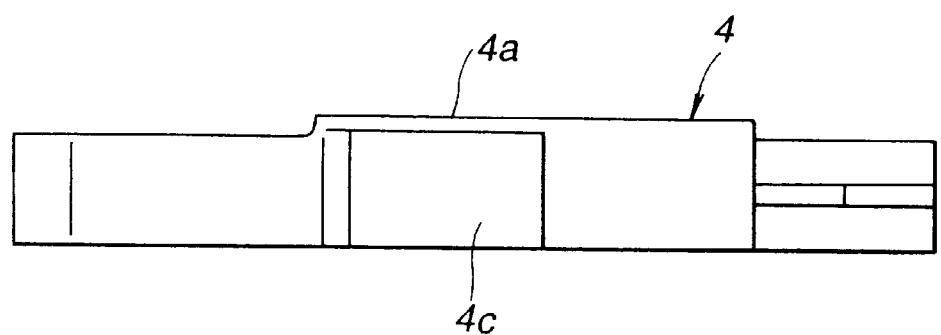
FIG. 2 is a side view showing the lower body as viewed from the left.
Figure 3:
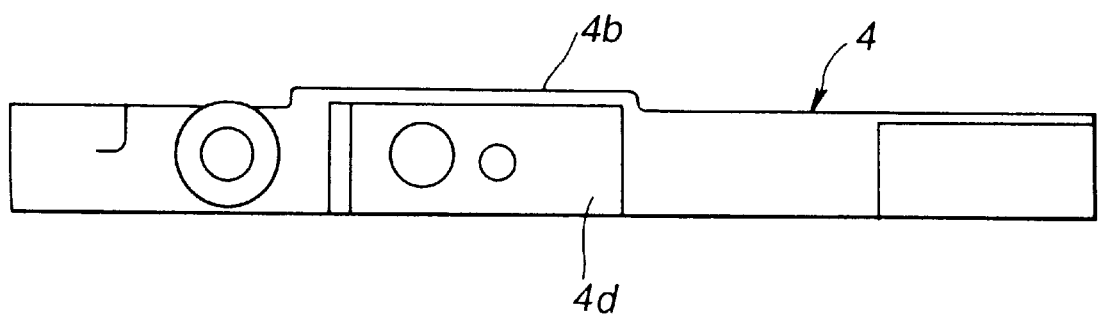
FIG. 3 is a view similar to FIG. 2, showing the lower body as viewed from the right.
Figure 4:
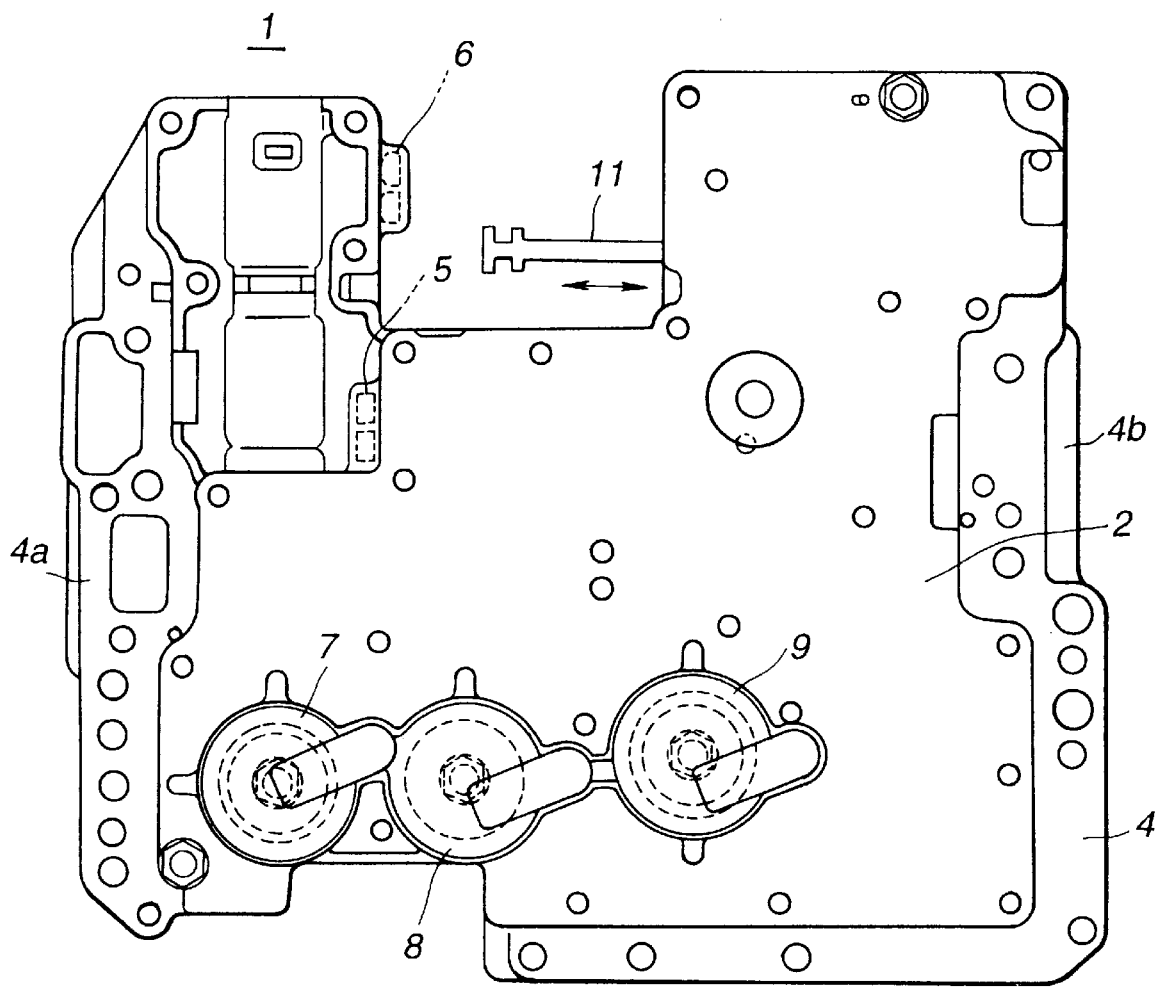
FIG. 4 is a plan view showing the control valve assembly.
Figure 5:
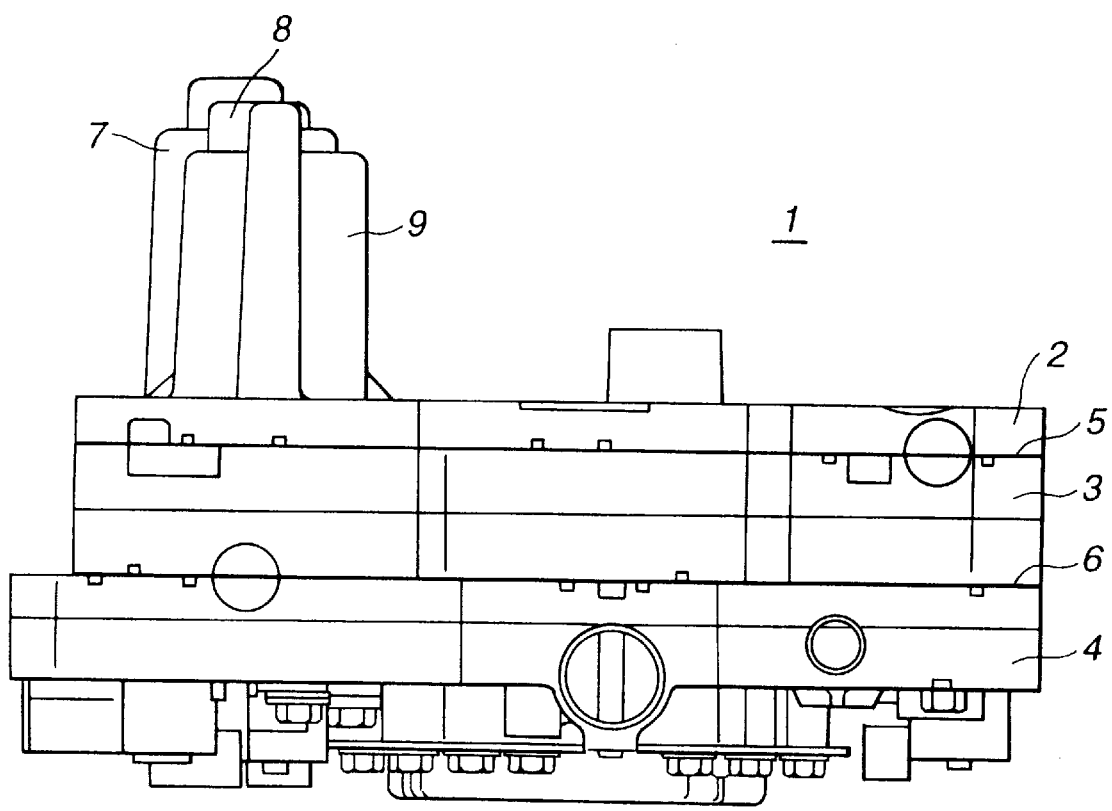
FIG. 5 is a view similar to FIG. 3, showing the control valve assembly.

Referring to FIGS. 4–5, a control valve device embodying the present invention comprises a control valve assembly 1 including a valve, a solenoid, etc. for producing a control pressure for automatic shifting. The control valve assembly 1 comprises an upper body 2, a middle body 3, and a lower body 4. A separate plate 5 is arranged between the upper and middle bodies 2, 3, whereas a separate plate 6 is arranged between the middle and lower bodies 3, 4. Accumulators 7, 8, 9 are vertically disposed on the upper body 2. Referring to FIGS. 1–3, the lower body 4 has at the outer periphery first and second protrusions 4a, 4b arranged horizontally with respect to a face 10b on which a valve body including the upper, middle, and lower bodies 2, 3, 4 is fixed (see FIG. 7). Each protrusion 4a, 4b has an extent substantially corresponding to a finger's length.

The first and second protrusions 4a, 4b are integrated with the lower body 4, and are arranged above recesses 4c, 4d formed therein at the outer periphery, respectively, as shown in FIGS. 1–3. Moreover, the first and second protrusions 4a, 4b are arranged in the opposite positions at the outer periphery of the lower body 4 so that a line connecting the protrusions 4a, 4b is substantially parallel to a manual valve 11 which is movable in the cross direction with respect to the lower body 4 as viewed in FIG. 1.

Figure 6:
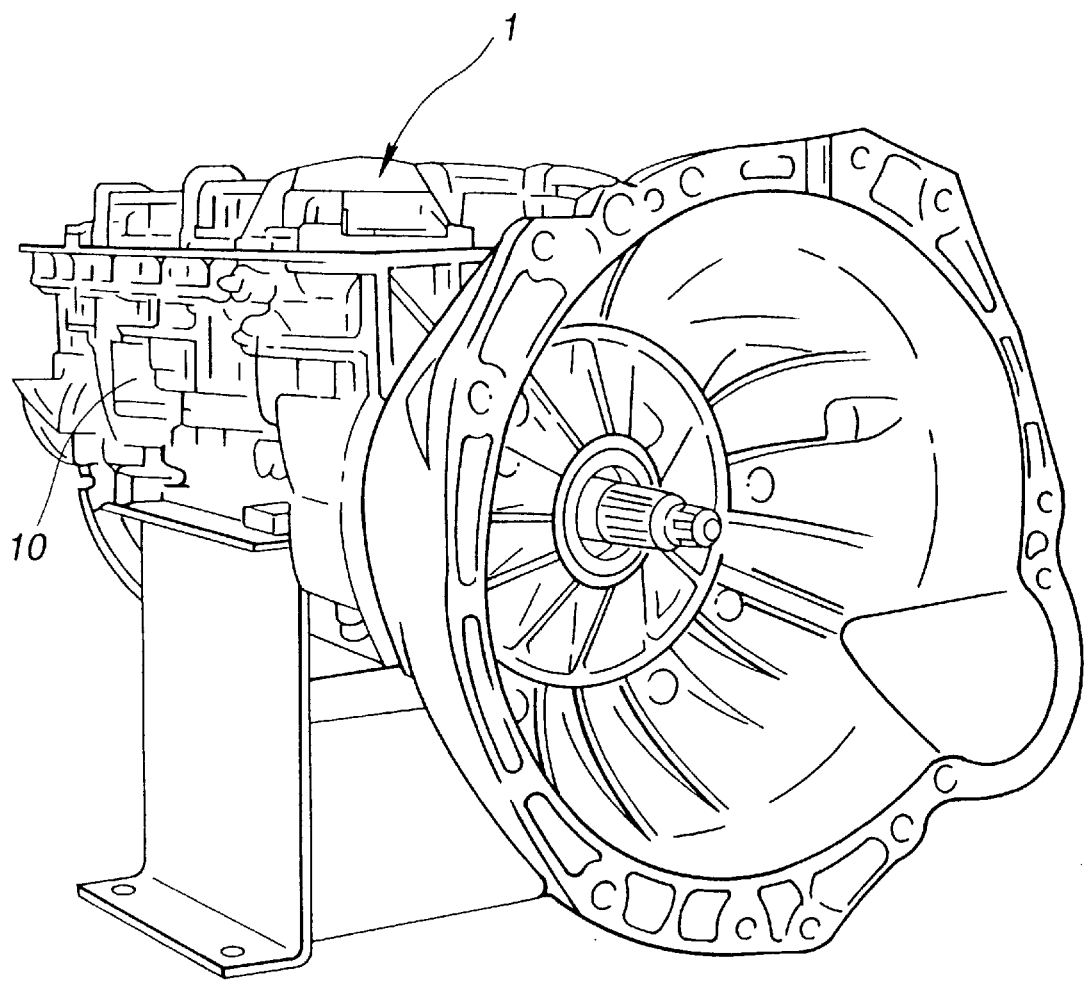
FIG. 6 is a perspective view showing the control valve assembly.
Figure 7:
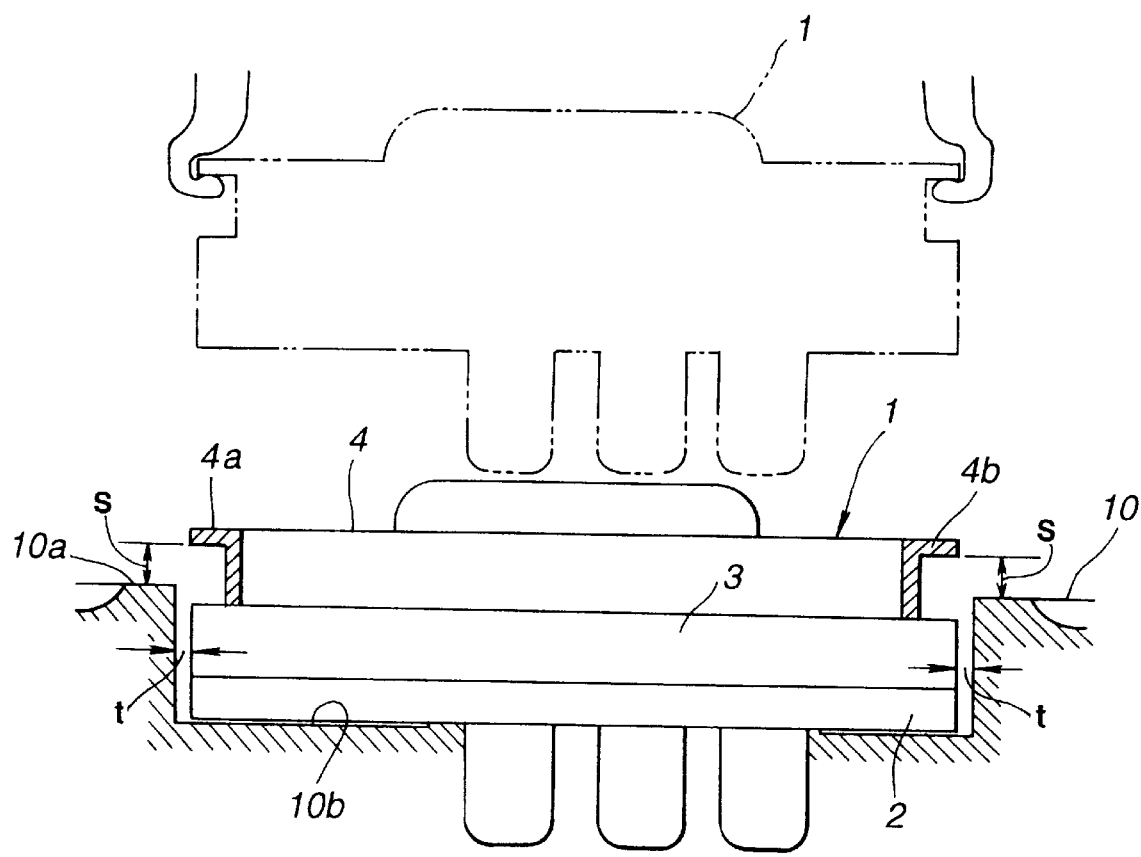
FIG. 7 is a schematic view showing mounting of the control valve assembly to a transmission casing.

Referring to FIG. 6, the valve body of the control valve assembly 1 is mounted to a transmission casing 10. Referring to FIG. 7, the transmission casing 10 has the valve-body fixing face 10b inside an outer peripheral face 10a on which an oil pan, a valve cover, etc. are fixed.

As shown in FIG. 7, the first and second protrusions 4a, 4b are formed so that when the valve body of the control valve assembly 1 is disposed on the valve-body fixing face 10b of the transmission casing 10, a space S which allows finger insertion is defined between the outer peripheral face 10a of the transmission casing 10 and the lower side of each protrusion 4a, 4b.

Next, the operation of the embodiment will be described.

Upon dismounting, referring to FIG. 6, an automatic transmission with a torque converter and an oil pan detached and with a control-valve face upward is disposed on a transmission-casing stand or special tool. Removing a distribution connector, an oil strainer, and a terminal clip, the control valve assembly 1 is removed from the transmission casing 10 by disengaging bolts. Referring to FIG. 7, upon removal of the control valve assembly 1, an operator inserts his fingers into the spaces S, and holds the first and second protrusions 4a, 4b to raise the control valve assembly 1.

Upon this removal, the operator does not need to insert his hands or fingers into spaces t between the valve body of the control valve assembly 1 and the transmission casing 10, so that even if the spaces t are too small to allow finger insertion as shown in FIG. 7, removal of the control valve assembly 1 from the transmission casing 10 can be carried out without difficulty.

Upon mounting, the operator holds the first and second protrusions 4a, 4b to carry the control valve assembly 1 above the transmission casing 10. The control valve assembly 1 is then put down and is disposed on the valve-body fixing face 10b of the transmission casing 10 for mounting through bolts.

Upon this mounting, also, the operator does not need to insert his hands or fingers into spaces t between the valve body of the control valve assembly 1 and the transmission casing 10, so that even if the spaces t are too small to allow finger insertion as shown in FIG. 7, removal of the control valve assembly 1 from the transmission casing 10 can be carried out without difficulty.

The embodiment produces the following effects:

First, with the control valve device wherein the transmission casing 10 has the valve-body fixing face 10b inside the outer peripheral face 10a on which an oil pan, a valve cover, etc. are fixed, the protrusions 4a, 4b are horizontally arranged at the outer periphery of the valve body of the control valve assembly 1 with respect to the valve-body fixing face 10b. Thus, even if the spaces t are too small to allow finger insertion, the control valve assembly 1 can easily be mounted to and dismounted from the transmission casing 10. As a result, compared with the prior art structure which needs between the valve body and the transmission casing the large spaces which allow hand insertion to enable mounting and dismounting of the control valve assembly, the inventive structure enables reduced size of the transmission casing 10, and secured circuit area of the control valve device without increasing the number of stages of the valve body;

Second, the protrusions 4a, 4b are integrated with the valve body of the control valve assembly 1. Thus, compared with the structure that protrusions 4a, 4b are formed separately from the valve body and are then fixed thereto, the inventive structure enables formation of the protrusions 4a, 4b at the stage of casting of the valve body, causing no increase in manufacturing cost due to subsequent mounting of the protrusions 4a, 4b;

Third, the protrusions 4a, 4b are arranged above the recesses 4c, 4d formed at the outer periphery of the lower body 4, enabling minimum enlargement of the outer diameter of the valve body;

Fourth, the line connecting the protrusions 4a, 4b is substantially parallel to the stroke direction of the manual valve 11 which is movable with respect to the lower body 4, so that the manual valve 11 is kept substantially horizontal upon mounting of the control valve assembly 1, causing no disengagement from the lower body 4. Note that when a valve which is movable with respect to the valve body is arranged to be substantially perpendicular to the line connecting the protrusions 4a, 4b, the valve will be moved if the valve body is inclined upon mounting;

Fifth, the protrusions 4a, 4b are arranged in the opposite positions at the outer periphery of the valve body, enabling efficient mounting and dismounting of the control valve assembly 1 with both hands; and Sixth, the protrusions 4a, 4b are formed so that when the valve body of the control valve assembly 1 is disposed on the valve-body fixing face 10b of the transmission casing 10, the space S which allows finger insertion is defined between the outer peripheral face 10a of the transmission casing 10 and the lower side of each protrusion 4a, 4b, enabling mounting and dismounting of the control valve assembly 1 without finger insertion into the spaces t between the valve body and the transmission casing 10. Thus, the spaces t can be reduced to allow mounting and dismounting of the control valve assembly 1 without interference with the transmission casing 10.

Having described the present invention with regard to the preferred embodiment, it is noted that the present invention is not limited thereto, and various changes and modifications can be made without departing from the scope of the present invention.

What is claimed is:

1. An automatic transmission, comprising:

a casing, said casing having an outer peripheral face and being formed with a recess, said recess having a fixing face;

a valve assembly, said valve assembly including a body arranged in said recess of said casing and on said fixing face of said recess, said valve assembly producing a control pressure for automatic shifting, wherein when said body of said valve assembly is arranged in said recess of said casing, a space between an outer periphery of said body of said valve assembly and an inner periphery of said recess of said casing is too narrow to allow finger insertion; and protrusions arranged at said outer periphery of said body of said valve assembly, said protrusions being located outside with respect to said outer peripheral face of said casing, said protrusions being parallel to said fixing face of said recess of said casing, said protrusions being manually engageable to hold said valve assembly, wherein when said body of said valve assembly is disposed on said fixing face of said recess of said casing, a space allowing finger insertion is defined between the outer most surface of said outer peripheral face of said casing adjacent to the recess and each of said protrusions, and wherein when said valve assembly is arranged in said recess of said casing it is held in position by fasteners which do not engage said protrusions.

2. An automatic transmissions as claimed in claim 1, wherein said protrusions are integrated with said body of said valve assembly.

3. An automatic transmission as claimed in claim 1, wherein said fasteners are threaded fasteners.

4. An automatic transmission as claimed in claim 1, wherein said protrusions are arranged in two opposite positions at said outer periphery of said body of said valve assembly.

5. An automatic transmission as claimed in claim 4, further comprising a valve which is movable in at least one direction with respect to said body of said valve assembly, said protrusions being arranged so that a line connecting said protrusions is substantially parallel to said valve.

* * * * *